United States Patent
Hall

(10) Patent No.: US 9,567,023 B2
(45) Date of Patent: Feb. 14, 2017

(54) MODULAR TOWABLE TRAILER SYSTEM

(71) Applicant: Kevin L. Hall, Watkinsville, GA (US)

(72) Inventor: Kevin L. Hall, Watkinsville, GA (US)

(*) Notice: Subject to any disclaimer, the term of this patent is extended or adjusted under 35 U.S.C. 154(b) by 0 days.

(21) Appl. No.: 14/818,188

(22) Filed: Aug. 4, 2015

(65) Prior Publication Data
US 2016/0031502 A1 Feb. 4, 2016

Related U.S. Application Data

(60) Provisional application No. 62/071,953, filed on Aug. 4, 2014.

(51) Int. Cl.
*B62D 21/20* (2006.01)
*B62D 63/06* (2006.01)
*B60P 1/64* (2006.01)

(52) U.S. Cl.
CPC ............ *B62D 63/062* (2013.01); *B60P 1/6409* (2013.01); *B60P 1/6445* (2013.01); *B62D 21/20* (2013.01)

(58) Field of Classification Search
CPC ...... B60P 1/6445; B60P 1/6409; B62D 21/20; B62D 63/062
See application file for complete search history.

(56) References Cited

U.S. PATENT DOCUMENTS

| | | | | |
|---|---|---|---|---|
| RE29,006 E | * | 10/1976 | Coleman | G09F 13/04 40/588 |
| 5,308,213 A | * | 5/1994 | Gilbertson | B60P 1/025 254/3 R |
| 5,474,416 A | * | 12/1995 | Rogge | B60P 1/025 414/481 |
| 6,349,952 B1 | | 2/2002 | Kallstrom | |
| 6,447,237 B1 | * | 9/2002 | Haynes | B60P 3/122 280/43.18 |
| 6,585,285 B2 | | 7/2003 | Koch | |
| 6,840,543 B2 | | 1/2005 | Dufty | |
| 6,945,744 B1 | * | 9/2005 | Swanson | B60P 1/025 414/482 |
| 7,708,299 B2 | | 5/2010 | Duval et al. | |
| 7,976,265 B2 | * | 7/2011 | Badry | B60P 1/025 280/43.11 |
| 8,157,288 B2 | | 4/2012 | Kapels | |
| 8,727,692 B2 | | 5/2014 | Simpson | |
| 9,050,920 B2 | * | 6/2015 | Aubrey | B60P 1/027 |
| 2004/0123529 A1 | | 7/2004 | Wiese et al. | |

* cited by examiner

*Primary Examiner* — Anne Marie Boehler
*Assistant Examiner* — Marlon A Arce
(74) *Attorney, Agent, or Firm* — Robert A. Blaha; Smith Tempel Blaha LLC

(57) ABSTRACT

A towable system includes a U-shaped chassis and a removable load module. The U-shaped chassis includes a first side member and an opposed side member that define a chassis separation distance. The opposed side members include respective mounting surfaces. A frame of the removable load module fits within the chassis separation distance and has complimentary surfaces to the respective mounting surfaces and support members. The support members and the frame are arranged to fit within an area defined by the U-shaped chassis.

20 Claims, 7 Drawing Sheets

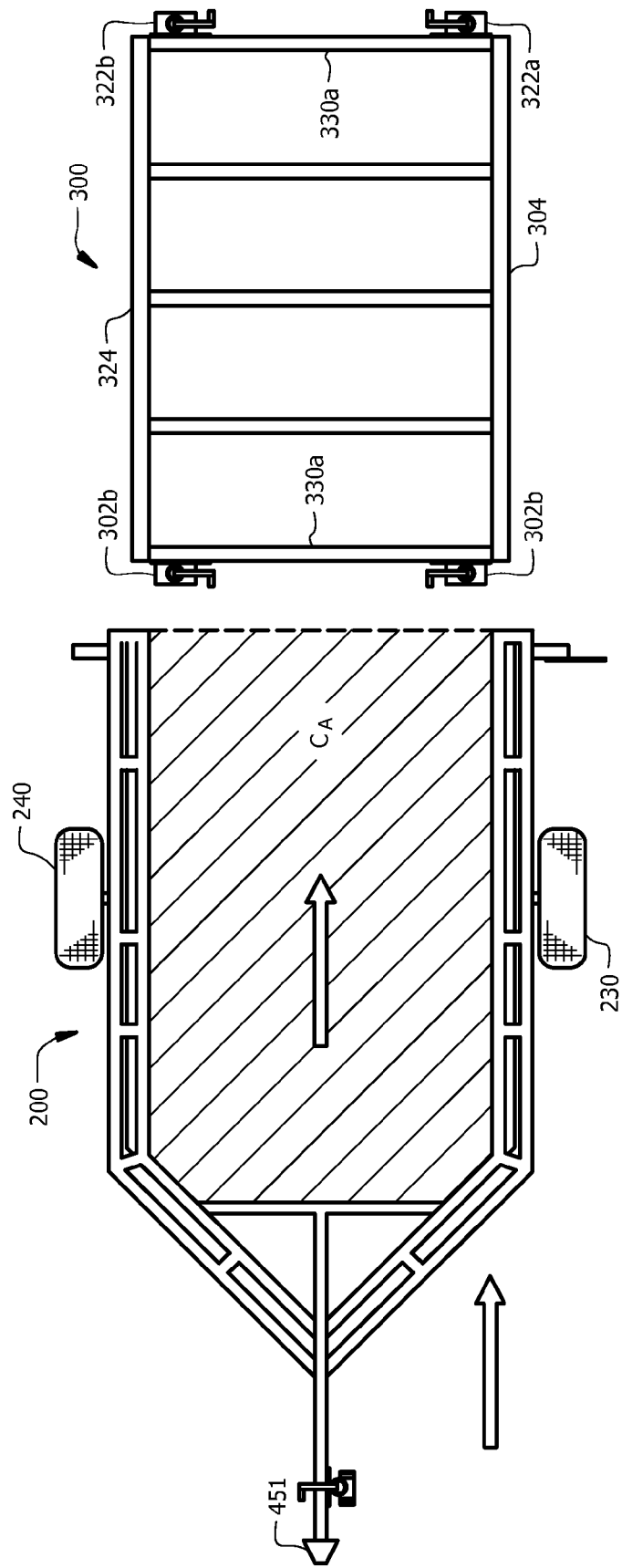

ly illustrating the inventive principles involved.

MODULAR TOWABLE TRAILER SYSTEM

CROSS-REFERENCE TO RELATED APPLICATION

This application claims the benefit of U.S. Provisional Patent Application Ser. No. 62/071,953, entitled, "Adapt2Tow," filed on Aug. 4, 2014, hereby fully incorporated herein by reference.

TECHNICAL FIELD

The present disclosure is directed to a land-based vehicle, and more particularly a towable trailer system that is towable behind a vehicle and adapted for multiple uses.

BACKGROUND

Available tow-behind trailers are generally arranged with a planar deck to support one or more items placed thereon. Such tow-behind trailers are suitable for moving recreational vehicles, utility vehicles, equipment, materials, etc. However, due to their one size fits all approach, such trailers often present difficulties for loading, unloading and securely fastening and/or supporting the intended load on the tow-behind trailer.

Alternatively available tow-behind trailers are arranged with or without a deck and provide rollers or other surfaces for supporting complimentary surfaces of a watercraft. Such tow-behind trailers are often arranged with a manual or motor driven winch to assist an operator with loading or unloading the watercraft from the trailer. In contrast, to the one-size fits all approach of the multi-purpose two-behind trailer, such watercraft trailers are typically specific to a particular type or size of watercraft. Thus, an owner operator of various types of watercraft must procure multiple trailers.

SUMMARY

Example embodiments of a modular towable trailer system are disclosed that enable a chassis to be maneuvered about a removable load module. When arranged in close registration, the removable load module is controllably lowered until complimentary surfaces of the load module engage respective support surfaces of the chassis. With the load supported by and coupled to the chassis, the towable system can be used to transport the load as may be desired. Thereafter, the load module and its load can be decoupled, controllably heightened and removed from the chassis, leaving the chassis available to engage another suitably arranged load module.

A modular towable trailer system includes a U-shaped chassis and a removable load module. The U-shaped chassis includes a first side member and an opposed side member. Each of the first side member and the opposed side member are arranged with a respective mounting surface. The first side member and the opposed side member further define a chassis separation distance and a chassis area. The removable load module is arranged with a frame including rails and support members arranged to fit within the chassis area. The rails are fixed to respective complimentary members that are controllably supported by the respective mounting surfaces of the first side member and the and the opposed side member when the removable load module is in registration with the U-shaped chassis.

The modular towable trailer system, as defined in the claims, can be better understood with reference to the following drawings. Unless specifically described, the components within the drawings are not necessarily to scale relative to each other; emphasis instead is placed upon clearly illustrating the inventive principles involved.

BRIEF DESCRIPTION OF THE DRAWINGS

In the drawings, like reference numerals refer to like parts throughout the various views unless otherwise indicated. For reference numerals with letter character designations such as "302A" or "302B", the letter character designations may differentiate two like parts or elements present in the same figure. Letter character designations for reference numerals may be omitted when it is intended that a reference numeral to encompass all parts having the same reference numeral in all figures.

FIG. 4A illustrates how the U-shaped chassis of FIG. 2 can be maneuvered about the support members of a separated removable load module of FIG. 3.

DETAILED DESCRIPTION

Figure 1:
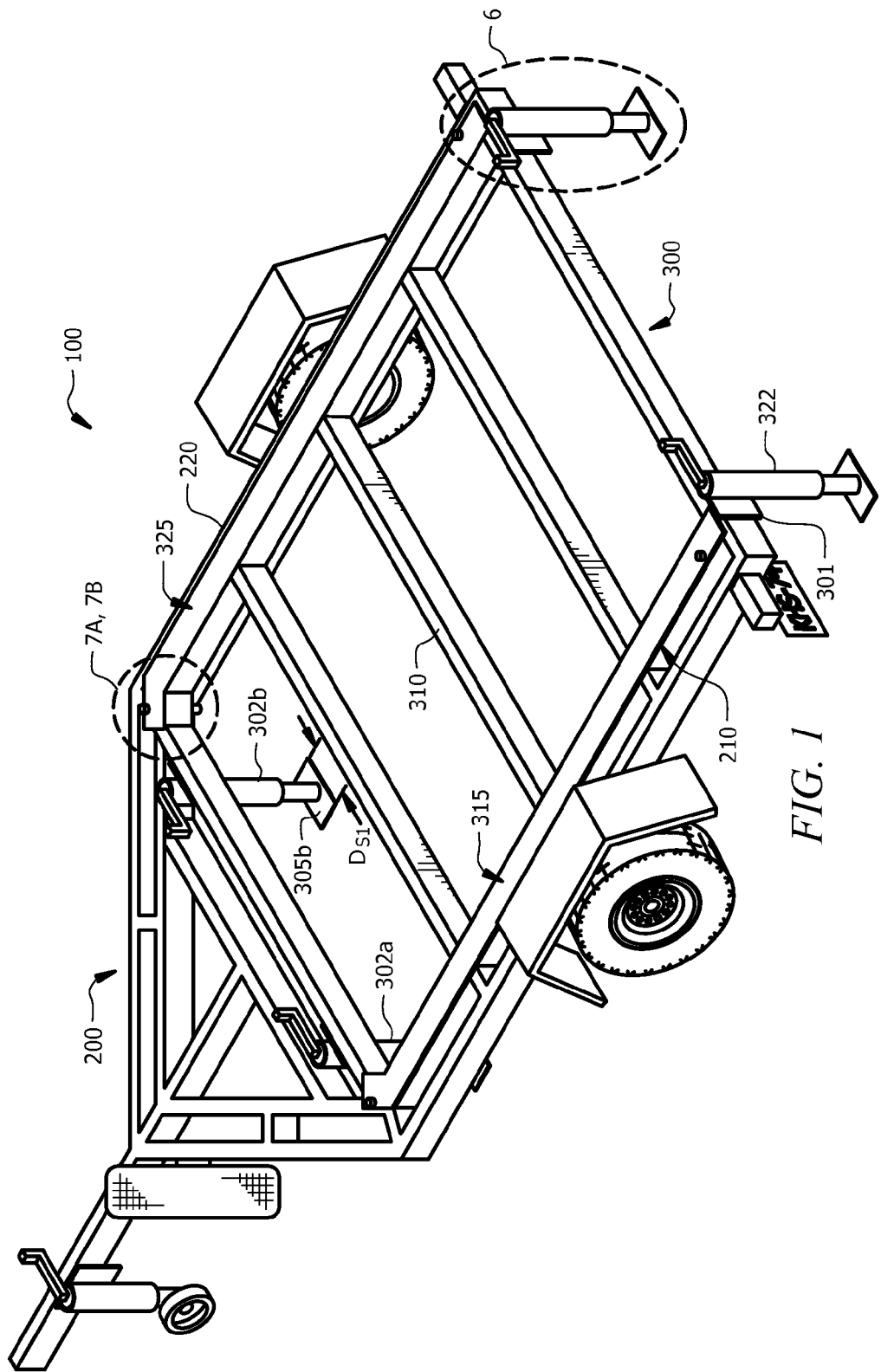
FIG. 1 is a schematic diagram illustrating an example embodiment of a modular towable trailer system in a perspective view.

The word "exemplary" is used herein to mean "serving as an example, instance, or illustration." Any aspect described herein as "exemplary" is not necessarily to be construed as preferred or advantageous over other aspects unless a preference is expressly indicated.

As used in this description, the term "system," is intended to refer to a combination of a towable chassis and a removable self-supporting load module.

In accordance with the above described difficulties presented by available general purpose and specific purpose tow-behind trailers, economical and practical improvements are embodied in a modular towable trailer system that includes a U-shaped chassis and a removable load module. Separate, interchangeable and uniquely arranged load modules each include structures that enable the load modules to be interchangeably connected to and disconnected from the U-shaped chassis.

In an exemplary embodiment, a first support member and an opposed support member of the chassis are arranged with mounting surfaces to support complimentary surfaces of a suitably configured load module. The mounting surfaces are substantially planar and traverse a significant portion of the length if not the entirety of the respective lengths of the support members. Alternatively, the mounting surfaces may extend beyond the support members. The respective mounting surfaces form one or more holes, slots, channels or recesses for receiving a pin that extends through a complimentary surface of the load module. Alternatively, a projecting member extending from a complimentary surface of the load module may extend into a hole, slot, channel or recess for aligning the removable load module and the U-shaped chassis.

When a pin is used, the pin may be coupled to one of the load module or the U-shaped chassis via a chain. The chain will have a first end fixed to one of the load module and the U-shaped chassis and an opposed end coupled to the pin. In addition, one or more spring-loaded mounts may be coupled to various surfaces of one or both of the U-shaped chassis or the load module for storing a respective pin. In addition, a pin may be arranged with a transverse hole through to receive a cotter pin.

In addition to the first support member and an opposed support member, the U-shaped chassis includes a hitch, a hitch member, a hitch crossmember, a first extension of the first side member is connected to the hitch member and the hitch crossmember, and an opposed extension of the opposed side member is connected to the hitch member and the hitch crossmember. The U-shaped chassis is also arranged with respective independent suspension wheel assemblies that avoid a single axle that would otherwise traverse the width of the chassis.

The U-shaped chassis is further arranged with electrical circuits for brakes, lighting, a license plate mount, and may optionally include structures for securely supporting a spare tire and wheel and for securely storing ancillary items such as tie downs, adjustable straps, tarps, or other items as may be desired. The U-shaped chassis is provided with an electrical connector to enable operation of clearance, backup, and/or additional brake lights mounted on the load module.

In an exemplary embodiment the support members adjustably support the frame above a storage surface with respective separately operable trailer jacks. The separately operable trailer jacks include a mechanism for adjusting the length of a support leg in a first direction that raises the complimentary members of the removable load module above the mounting surfaces of the U-shaped chassis and in an opposed direction that lowers the complimentary members of the removable load module into contact with the mounting surfaces of the U-shaped chassis. At least one of the support members is removably coupled to the frame of the removable load module via a respective mount or mounts. Each respective mount may be permanently (e.g., by a weld or welds) or removable fixed (e.g., by a bracket or bracket and fasteners) to the removable load module.

In an exemplary embodiment the removable load module includes a cargo specific support element supported by the frame and/or by a structure or structures of the removable load module, e.g., a crossmember. In some arrangements a cargo specific support element will extend from or be coupled to a deck of the load module. The illustrated embodiments do not include a ramp or ramps, as such features are well known and adaptable to tow-behind trailers.

In an exemplary embodiment, the first side member and the opposed side member of the U-shaped chassis define respective features for aligning and engaging the load module. In one arrangement, the respective features for aligning and engaging the load module include a hole formed in the chassis. In this arrangement, one of the first side member, the opposed side member, a first complimentary member or a second or opposed complimentary member are arranged with a pin and a corresponding hole.

In an alternative arrangement, the respective features for aligning and engaging the load module include a channel or slot formed in the chassis. In this alternative arrangement, one of the first side member, the opposed side member, the first complimentary member or the opposed complimentary member are arranged with a feature that extends into the channel. For example, one of the first complimentary member and the opposed complimentary member can be arranged with a feature that extends into the channel.

The respective features for aligning and engaging the load module may further include a plate that may be smaller in one direction than an adjacent surface of the first side member or opposed side member of the U-shaped chassis. Alternatively, the plate may extend beyond a complimentary adjacent or mounting surface of the first side ember or the opposed side member. In some arrangements, the plate may include a bend. In some arrangements, the plate may extend beyond a complimentary mounting surface of the U-shaped chassis in at least two directions.

In an exemplary embodiment the first side member and the opposed side member of the U-shaped chassis each include respective first and second rails separated by at least two crossmembers.

In another exemplary embodiment the U-shaped chassis further includes a hitch member, a hitch crossmember, a first extension of the first side member connected to the hitch member and the hitch crossmember, and an opposed extension of the opposed side member that is connected to the hitch member and the hitch crossmember.

The U-shaped chassis is arranged with at least one independent suspension and wheel assembly along each of the first side member and the opposed side member, respectively.

It should be understood that the U-shaped chassis is maneuverable about the removable and self-supported load module.

In addition, the U-shaped chassis is maneuverable below both the first complimentary member and the opposed complimentary member of the removable self-supported load module.

The U-shaped chassis, as briefly described, defines a separation distance and a chassis area between the first side member and the opposed side member that enables the chassis to be maneuvered about a separated and self-supported removable load module. This relative motion can be accomplished when the U-shaped chassis is coupled via the hitch to a vehicle or alternatively when the U-shaped chassis is decoupled from a vehicle. When arranged in close registration, the removable load module is lowered relative to the ground until the complimentary members engage corresponding mounting surfaces of the U-shaped chassis. With the load supported by and coupled to the U-shaped chassis, the modular towable system can be used to transport unique loads as may be desired. Thereafter, the removable load module and its unique cargo can be decoupled and separated from the U-shaped chassis, leaving the U-shaped chassis available to engage another suitably arranged load module.

The improved system provides an economical solution to the previously described shortcomings with available tow-behind trailers. For example, the costs associated with the upkeep and registration of a single trailer can be leveraged across two or more removable load modules.

Reference is now directed to the illustrated examples. An example embodiment of a non-limiting aspect of a modular towable trailer system 100 is presented in FIG. 1 in a perspective view. The modular towable trailer system 100 includes U-shaped chassis 200 and removable load module 300. Details of an embodiment of the U-shaped chassis 200 are shown in FIG. 2. Details of an embodiment of the removable load module 300 are shown in FIG. 3. Dashed ellipse 6 defines a location of a removable support member embodied in a jack assembly. Details of an embodiment of a removable support member and mounts are illustrated and described in association with FIG. 6. Dashed ellipse 7A, 7B defines a location where complimentary member 325 is engaged and supported by a corresponding portion of mounting surface 225 (FIG. 2). Details of alternative embodiments of engagement arrangements are illustrated and described in association with FIG. 7A and FIG. 7B.

Figure 2:
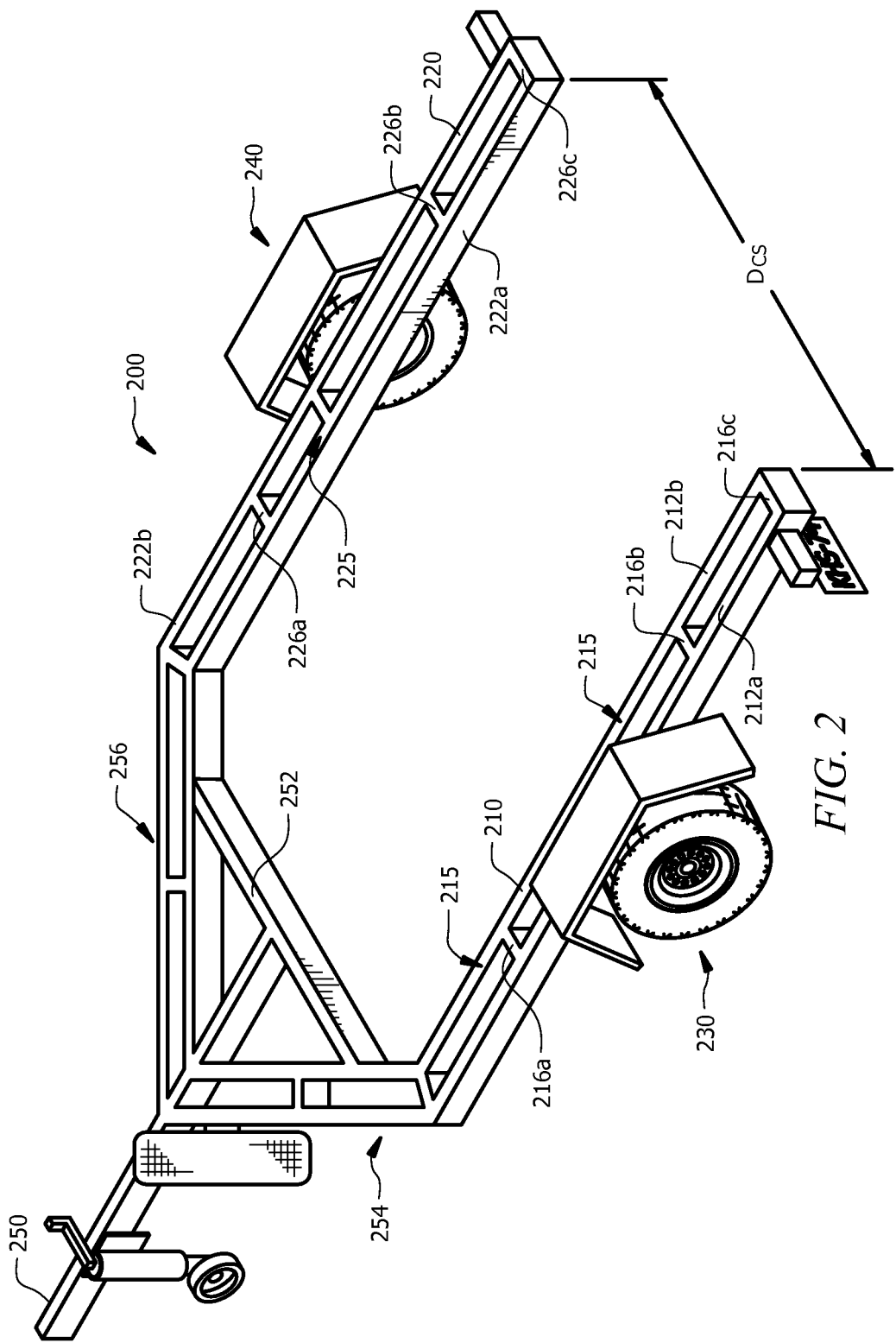
FIG. 2 is schematic diagram illustrating an example embodiment of a U-shaped chassis of the modular towable trailer system of FIG. 1 without the removable load module.
Figure 3:
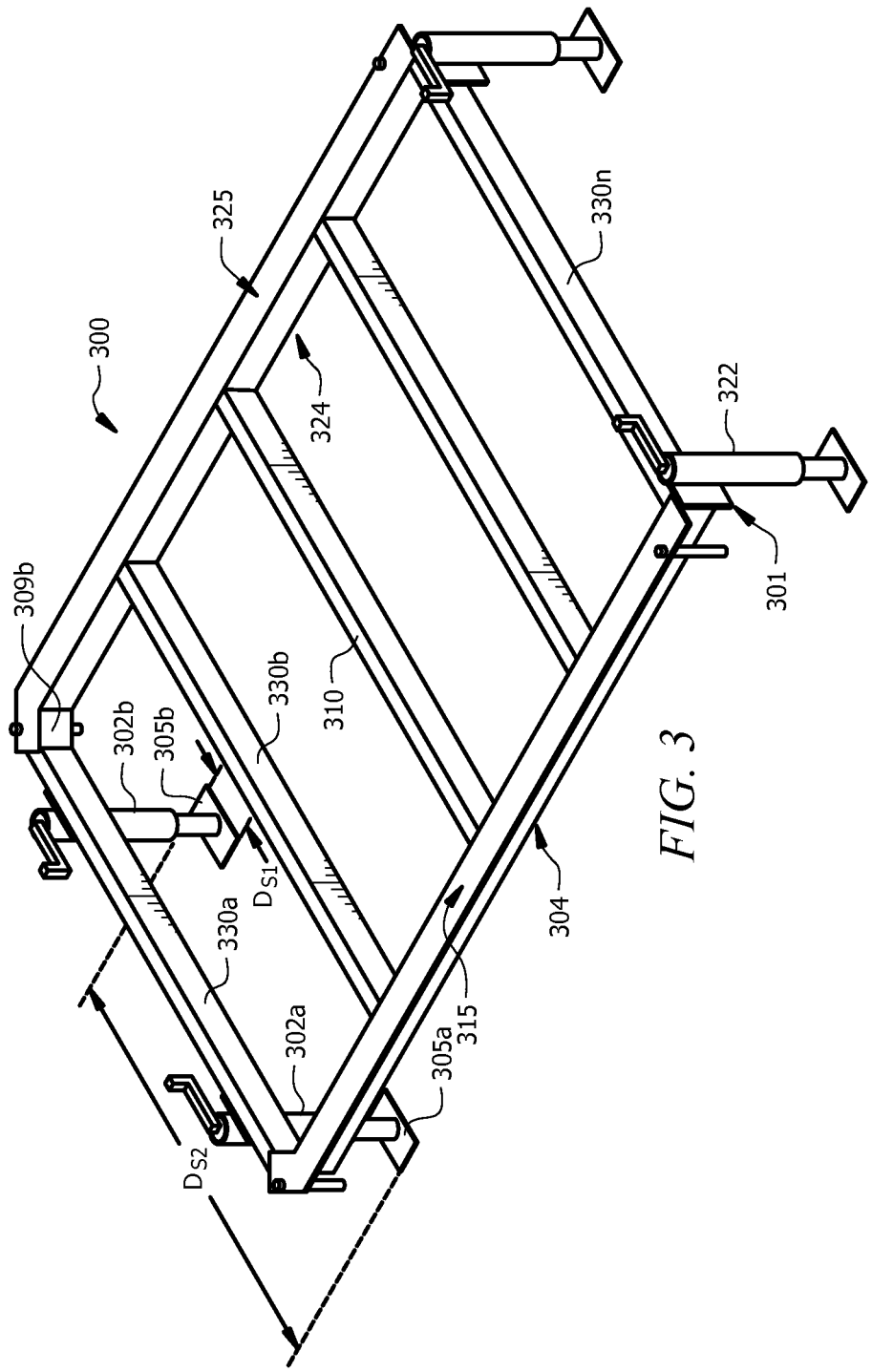
FIG. 3 is a schematic diagram illustrating an example embodiment of the removable module of FIG. 1 without the U-shaped chassis of FIG. 2.

FIG. 2 illustrates the example embodiment of the U-shaped chassis 200 of the modular towable trailer system 100 of FIG. 1 in a perspective view without the removable load module 300. The U-shaped chassis 200 includes hitch member 250 which at a first or vehicle end supports a conventional trailer coupler (not shown) and at an opposed end terminates at a mid-point of hitch crossmember 252. Extension 254 is arranged between hitch member 250 and side member 210. A first end of hitch crossmember 252 is connected to a side rail of extension 254. The connection between hitch member 250 and hitch crossmember 252 approximately forms two right angles. Extension 256 is arranged between hitch crossmember 252 and side member 220, which is opposed to side member 210. A second or opposed end of hitch crossmember 252 is connected to a side rail of extension 256. The connection between hitch member 250 and hitch crossmember 252 also forms a common base for opposed right triangles, which are completed by the respective connections between extension 254 and extension 256 at the ends of hitch crossmember 252 and the respective connections between extension 254 and extension 256 and hitch member 250.

Side member 210 extends from or is coupled to the remaining end of extension 254. Side member 210 is supported by a tire, wheel and axle-less trailer suspension assembly 230. A suitable trailer suspension assembly 230 is available from Timbren Industries, Inc. An optional fender may be coupled to the side member 210. Side member 210 includes a set of substantially parallel rails 212. An outermost rail 212a is coupled to an innermost rail 212b via a set of crossmembers 216. As illustrated, crossmembers 216 connect the outermost rail 212a to the innermost rail 212b at their respective ends and at select locations distributed alongside member 210. While crossmembers 216a through 216c are specifically referenced, side member 210 may be arranged with more or fewer crossmembers 216. The upward face of innermost rail 212b provides a mounting surface 215, which as illustrated in FIG. 1 supports a complimentary member 315 of removable load module 300 (FIG. 3).

Opposed side member 220 extends from or is coupled to the remaining end of extension 256. Opposed side member 220 is supported by a tire, wheel and axle-less trailer suspension assembly 240. An optional fender may be coupled to the opposed side member 220. Opposed side member 220 includes a set of substantially parallel rails 222. An outermost rail 222b is coupled to an innermost rail 222a via a set of crossmembers 226. As illustrated, crossmembers 226 connect the outermost rail 222b to the innermost rail 222a at their respective ends and at select locations distributed along opposed side member 220. While crossmembers 226a through 226c are specifically referenced, opposed side member 220 may be arranged with more or fewer crossmembers 226. The upward face of innermost rail 222a provides a mounting surface 225, which supports complimentary member 325 of removable load module 300 (FIG. 3).

The side member 210 and the opposed side member 220 and more specifically an inward facing surface of the innermost rail 212b and a corresponding surface of the innermost rail 222a define a chassis separation distance, Dcs, and a chassis area or clearance area. The chassis separation distance in conjunction with the length of side member 210 and opposed side member 220 define an acceptable support area in which supporting surfaces and support structures are provided in or with a removable load module 300.

In a preferred embodiment, hitch member 250, hitch crossmember 252, opposed rails and crossmembers forming extensions 254, 256, as well as, opposed rails 212a, 212b, 222a, 222b and respective crossmembers 216, 226 are made of metal and are hollow. When severed or sectioned, the members may have a square or rectangular cross-section. In alternative embodiments, one or more members may have a circular cross-section. Joints may be welded, supplemented or strengthened with plates or connectors that receive and overlap an end portion of a member. Plates or connectors or both may be accompanied by securing hardware. External surfaces of the above described features of the U-shaped chassis 200 may be powder coated in a color that contrasts or compliments a color of complementary member 315 or complimentary member 325 of removable load module 300.

As further shown in FIG. 2, a trailer jack assembly is connected to hitch member 250 and a spare tire and wheel assembly is removably secured to one of extension 254 or extension 256. The trailer jack assembly includes a wheel, a supporting shaft, body, and height adjustment mechanism. The height adjustment mechanism can be manipulated by an operator to controllably retract the supporting shaft and the wheel coupled to it. When the coupler (not shown) has been placed in registration with a complimentary feature of a vehicle, such an adjustment will lower the coupler at the first end of hitch member 250 to enable coupling of the U-shaped chassis 200 to the towing vehicle.

As is also further shown in FIG. 2, the U-shaped chassis 200 may be arranged with a license plate mount and running lights including brake and back-up lights that are conventionally provided on trailers. The power and control interfaces for energizing the running lights are provided by respective signal circuits associated with the side member 210 and opposed side member 220. The respective signal circuits may be coupled to a tow vehicle by a conventional connector.

FIG. 3 is a schematic diagram illustrating an example embodiment of the removable module 300 of FIG. 1 without the U-shaped chassis 200 of FIG. 2 and with floor or support plate 510 and cargo specific support element 550 removed from the underlying structures of the assembly. In the illustrated embodiment, frame 310 includes rail 304 and rail 324 connected to each other by crossmembers 330a-330n. Connective rails 309 are connected to opposite ends of crossmember 330a and corresponding ends of rail 304 and rail 324. The connective rail 309a is connected to and extends from the rail 304 at an angle that reflects the angle at the intersection of side member 210 and extension 254 (FIG. 2). Similarly, the connective rail 309b is connected to and extends from the rail 324 at an angle that reflects the angle at the intersection of opposed side member 220 and extension 256 (FIG. 2). Complimentary member 315 is fixed to an upward facing surface of rail 304 and an upward facing surface of connective rail 309a. Complimentary member 325 is fixed to an upward facing surface of rail 324 and an upward facing surface of connective rail 309b.

Complimentary member 315 includes two suitably sized through holes for receiving pins that extend beyond both the upper surface and an opposed surface of the complimentary member 315. A first of the pins and its corresponding through hole are arranged proximal to a corner of the removable load module 300 in a portion of the complimentary member 315 that extends at an angle from the remaining portion. A second pin and a respective hole are located proximal to an opposed end of the removable load module 300 near a remaining corner of the complimentary member 315. The pins are arranged with a head portion that has a larger diameter than the through hole in the complimentary member 315 and a remaining portion that has a diameter smaller than a diameter of the hole. As shown in FIG. 1 and in greater detail in FIG. 7A, the pins may also extend entirely through a corresponding hole in the upper and lower surfaces of the connective rail 309b. When so arranged, the removable load module 300 is secured to the U-shaped chassis 200.

Complimentary member 325 includes two suitably sized through holes for receiving pins that extend beyond both the upper surface and an opposed surface of the complimentary member 325. A first of the pins and its corresponding through hole are arranged proximal to a corner of the removable load module 300 in a portion of the complimentary member 325 that extends at an angle from the remaining portion. A second pin and a respective hole are located proximal to an opposed end of the removable load module 300 near a remaining corner of the complimentary member 325. The pins are arranged with a head portion that has a larger diameter than the through hole in the complimentary member 325 and a remaining portion that has a diameter smaller than a diameter of the hole. When so arranged, the removable load module 300 is secured to the U-shaped chassis 200.

In a preferred embodiment, removable load module members such as rail 304, rail 324, connective rails 309 and crossmembers 330a-330n are made of metal and are hollow. When severed or sectioned, the members may have a square or rectangular cross-section. In alternative embodiments, one or more members may have a circular cross-section. Joints may be welded, supplemented or strengthened with plates or connectors that receive an end portion of a member and securing hardware. External surfaces of the above described features of the removable load module 300 may be powder coated in a color that contrasts or compliments a color of members of the U-shaped chassis 200.

Support members 302a, 302b are connected on a vertically oriented surface of crossmember 330a. Support members 322a, 322b are connected on a vertically oriented surface of crossmember 330n at an opposed end of the frame 310. Each of the support members 302a, 302b, 322a, 322b is coupled to the removable load module 300 via a respective mount 301. The mounts 301 may be permanently fixed to external surfaces of crossmember 330a and crossmember 330n at locations that define a support distance $D_{s2}$ that is shorter than the chassis separation distance Dcs (FIG. 1). As shown and described in greater detail in association with features in FIG. 6, the support members 302a, 302b, 322a, 322b may be removed from the removable load module 300 when the weight of the removable load module 300 and any cargo supported thereon are supported by the U-shaped chassis 200.

Each of the support members 302a, 302b, 322a, 322b contains an extendable shaft terminated with a respective support surface 305. Each of the support surfaces 305a, 305b define a support distance $D_{s1}$ that is shorter than the chassis separation distance Dcs (FIG. 1.) while providing a sufficient total ground contact surface to support a portion of an intended load and a portion of the weight of the removable load module 300.

FIG. 4A illustrates how the U-shaped chassis 200 of FIG. 2 can be maneuvered about a separated removable load module 300 of FIG. 3. The U-shaped chassis 200, when coupled to a vehicle by the coupler 251, can be maneuvered with respect to a stationary and height adjusted removable load module 300 such that mounting surface 215 of side member 210 and mounting surface 225 of the opposed side member are placed in registration under the lowermost surface of complimentary member 315 and complimentary member 325. Alternatively, the U-shaped chassis 200 can be supported by the wheel of the trailer jack to enable an operator to manipulate the U-shaped chassis 200 into registration with the removable load module 300.

In an alternative embodiment of a removable load module 300 (not shown), support members 302 and support members 322 may be arranged with one or more wheels fixed to the height adjustable shafts that extend and retract into the respective bodies of the jacks. When so arranged and with the adjustable shafts extended, the removable load module 300 may be moved into registration with a stationary U-shaped chassis 200. When two or more operators are available, the U-shaped chassis 200 and the removable load module 300 may be simultaneously moved toward or away from each other.

Figure 4B:
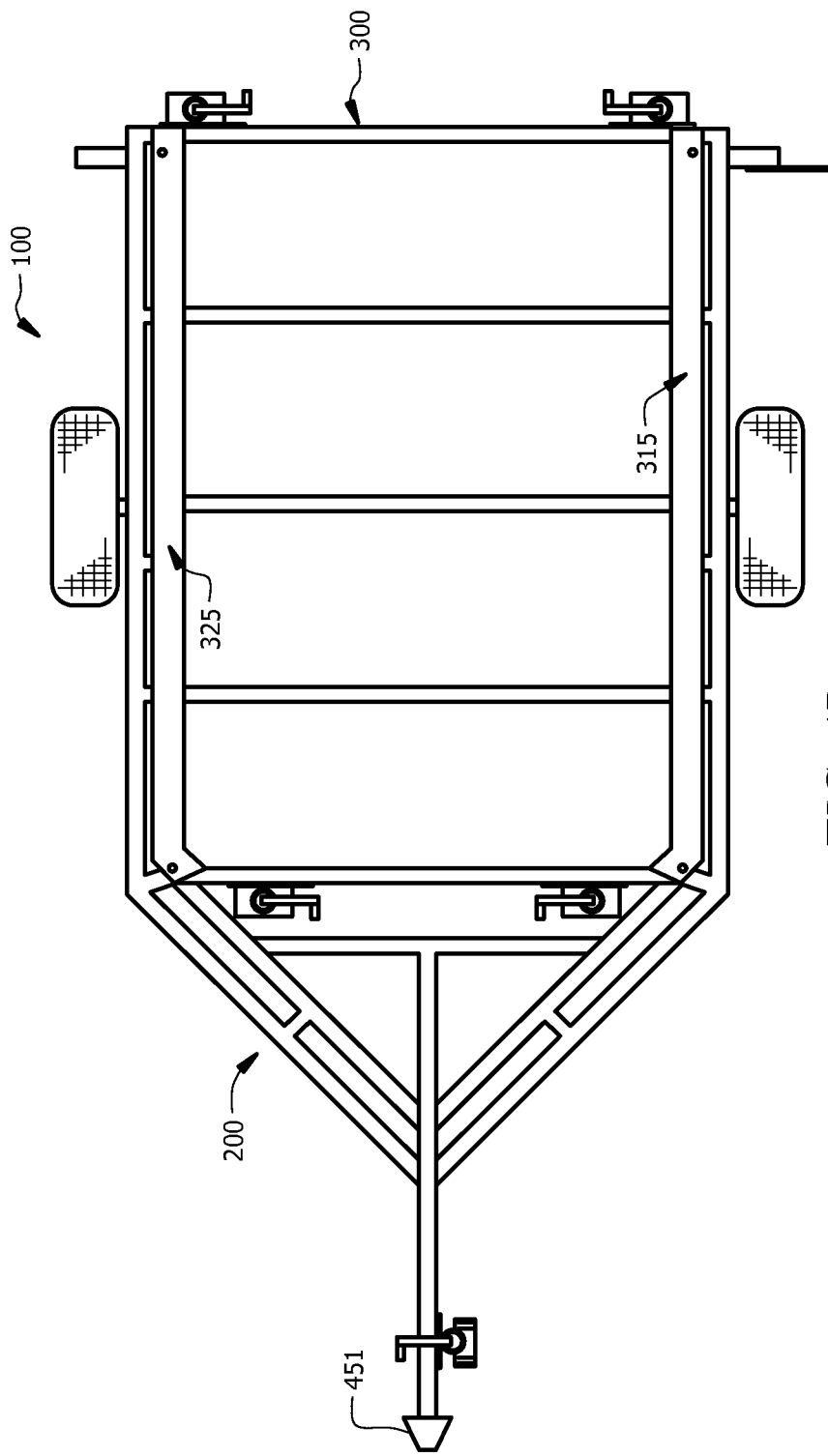
FIG. 4B is a top plan view of the U-shaped chassis of FIG. 2 in registration with the removable load module of FIG. 3.

FIG. 4B shows the U-shaped chassis 200 in close registration with the removable load module 300. When aligned in this arrangement, an operator can use the respective support members 322 provided with the removable load module 300 to lower the complimentary surface 315 and the complimentary surface 325 onto the mounting surface 215 and the mounting surface 225, respectively. As shown in greater detail in FIG. 6, with the removable load module 300 supported by the U-shaped chassis 200 one or more of the support members 322 can be removed from the removable load module 300.

Figure 5:
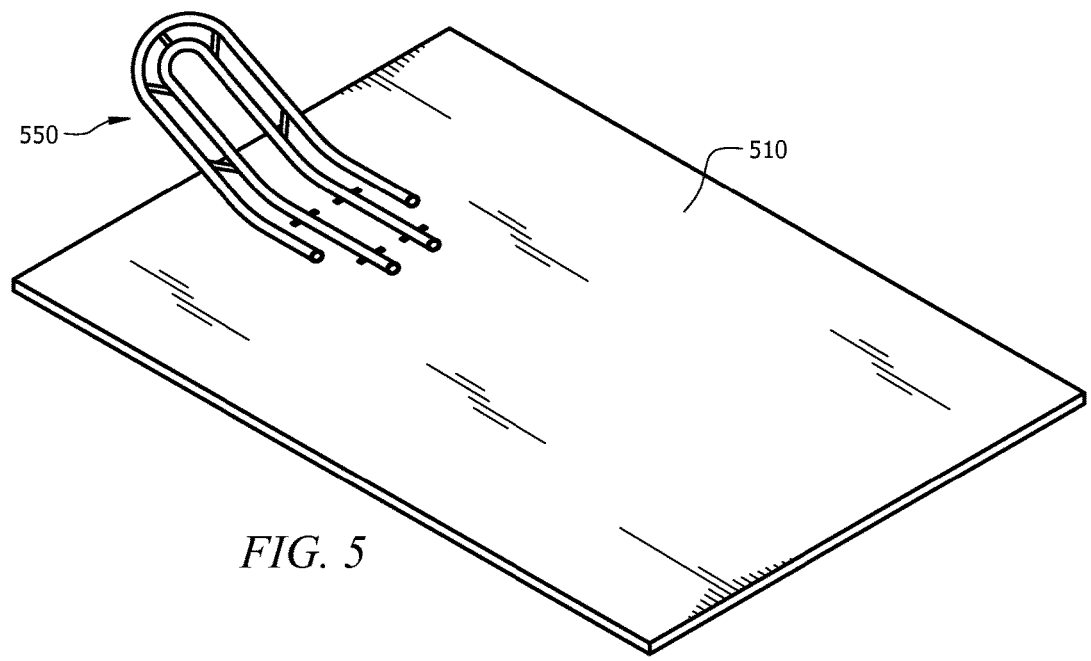
FIG. 5 is a schematic diagram illustrating an embodiment of a cargo specific support element.

FIG. 5 is a schematic diagram illustrating an embodiment of a cargo specific support element 550 fixed to an upper surface of a plate 510 that may be arranged above and connected to the frame 310 between complimentary surface 315 and complimentary surface 325 of the removable load module 300 of FIG. 1 and FIG. 3. In the illustrated embodiment, the cargo specific support element 550 is arranged to receivably guide and support a tire of a wheeled vehicle such as a motorcycle (not shown).

While the illustrated embodiment includes a single instance of an assembly of features arranged as a cargo specific support element 550, additional instances of this assembly and other structures and assemblies suitable to support and secure any number of various recreational vehicles, mowers, tools or any other desired load to the removable load module 300 may be added as desired. These arrangements and structures can be permanent and unique for each instance of a removable load module 300 as may be desired.

Figure 6:
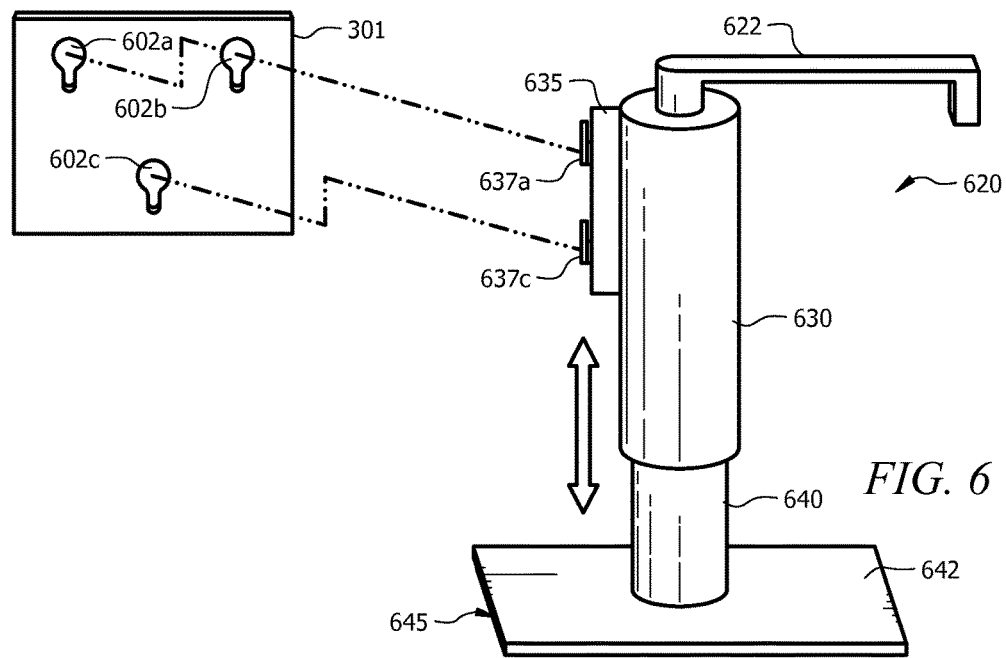
FIG. 6 is a schematic diagram illustrating features introduced in FIG. 1.

FIG. 6 is a schematic diagram illustrating an embodiment of a mount 301 with a removable support member embodied in a jack assembly 620 in proximity to the mount 301. Mount 301 is shown separate from a surface of removable load module 300. As shown, the mount 301 is arranged with slots 602a-602c suitably shaped to receive corresponding mounting members 637a-637c that extend from jack plate 635, which is fixed to body 630 of the jack assembly 620. Support leg 640 is connected to support plate 642, which is further connected to support or contact surface 645 for supporting a portion of the removable load module 300. As indicated by the arrows, rotational movement of adjustment arm 622 controllably extends support leg 640 in a direction away from the body 630 or retracts the support leg 640.

Figure 7A:
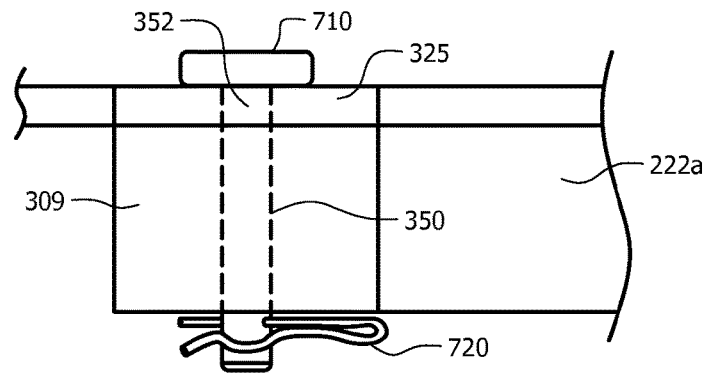
FIG. 7A and FIG. 7B illustrate alternative embodiments of alignment and engagement features introduced in FIG. 1.
Figure 7B:
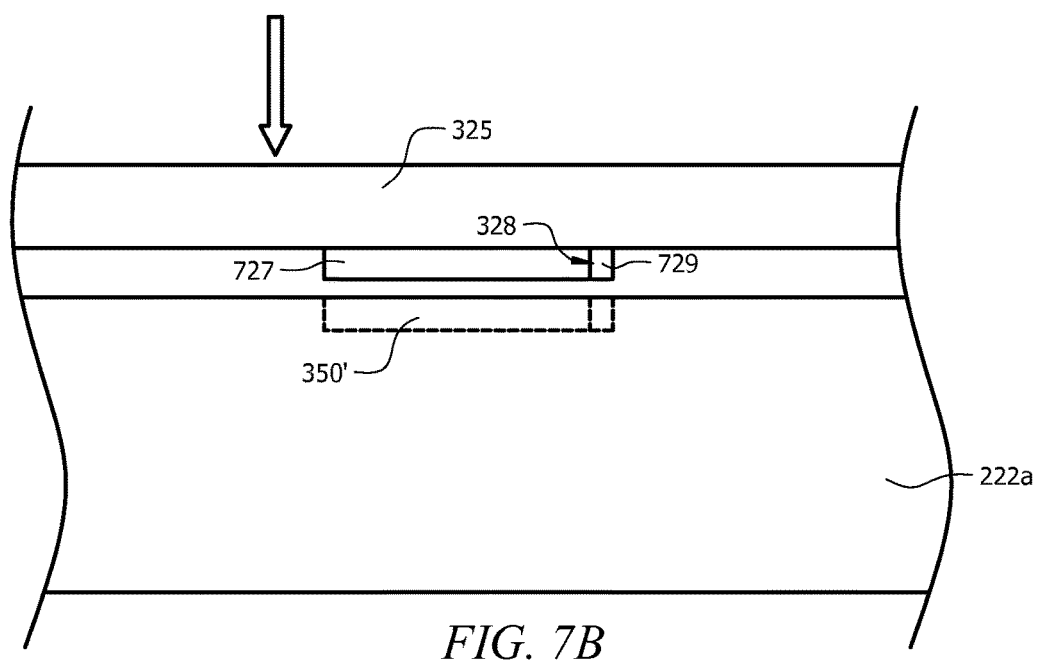

FIG. 7A and FIG. 7B illustrate alternative embodiments of alignment features. FIG. 7A includes a side plan view of rail 222a and complimentary member 325 in contact with each other. As illustrated, the complimentary member 325 is supported along its length by the rail 222a. Pin 710 extends through a hole 352 provided in the complimentary member 325 and a corresponding channel 350 provided in the connective rail 309. Pin 710 has a head portion with a diameter that is larger than the diameter of hole 352 to prevent the pin from falling through the complimentary member 325. A distal or opposed end of the pin 710 is arranged with a transverse passage for receiving a cotter pin 720. In alternative embodiments one or both of the pin 710 and the cotter pin 720 may be coupled to the removable load module 300 with a chain. As mentioned, a spring loaded clamp may be arranged along a surface of connective rail 309, rail 222a or rail 222b to store the pin 710 when it is not in use.

FIG. 7B includes an example of an alternative arrangement of alignment and engagement features that can be deployed in replacement of a pin and holes and/or channels that provide a passage through a rail. In the illustrated embodiment, an alignment feature 727 is included on the lower or contact surface of the complimentary member 325. The alignment feature 727 may be a metal plate that is welded or otherwise fixed to the complimentary member 325. The plate includes an extension member 729 that extends from a bend or intersection 728 in a different direction then the remaining portion of the alignment feature 727. A channel 350' is arranged in an upper or support surface of the rail 222a at an appropriate corresponding location to receive the alignment feature 727 and extension member 729 as the complimentary member 325 is lowered onto the rail 222a. The orientation of the alignment feature 727 engaged in the channel 350' prevents relative movement of the U-shaped chassis 200 and the removable load module 300 in a lateral direction. Similarly, the orientation of the extension member 729 engaged in the channel 350' prevents relative fore and aft movement of the U-shaped chassis 200 and the removable load module 300.

In alternative embodiments, a channel is provided in the contact surface of the complimentary member 325 and appropriately located features are provided along the upper or support surface of the rail 222a. These or other alignment features may be provided along rail 212b of side member 210 and complimentary member 315.

In still other embodiments, one or more male features may extend from the upper surface of rail 212b and/or rail 222a at the opposed or distal end of the towable system in close proximity to an edge of the respective complimentary member 315, 325 to provide both an alignment guide and a physical stop to prevent relative motion between the U-shaped chassis 200 and the removable load module 300. Similar features may be included along the upper surface of extension 254 and/or extension 256 at appropriate locations. Such features serve as both a visual alignment guide and as a physical stop to prevent forward motion of the removable load module 300 with respect to the U-shaped chassis 200.

Although selected aspects have been illustrated and described in detail, it will be understood that various substitutions and alterations may be made herein without departing from the present modular towable system, as defined by the following claims.

| List of reference signs: | |
| --- | --- |
| 100 | towable system |
| 200 | U-shaped chassis |
| 210 | side member |
| 212 | rail |
| 215 | mounting surface |
| 216 | crossmember |
| 220 | opposed side member |
| 222 | rail |
| 225 | mounting surface |
| 226 | crossmember |
| 230, 240 | wheel assy. |
| 250 | hitch member |
| 252 | hitch crossmember |
| 254 | extension |
| 256 | extension |
| 300 | removable load module |
| 301 | mount |
| 302 | support member |
| 304 | rail |
| 305 | support surface |
| 309 | connective rail |
| 310 | frame |
| 315 | complimentary member |
| 322 | support member |
| 324 | rail |
| 325 | complimentary member |
| 330 | crossmember |
| 350, 350' | channel |
| 352 | hole |
| 451 | coupler |
| 510 | plate |
| 550 | cargo specific support element |
| 602 | slot |
| 620 | jack assembly |
| 622 | adjuster arm |
| 630 | body |
| 635 | jack plate |
| 637 | mounting member |
| 640 | support leg |
| 642 | support plate |
| 645 | support surface |
| 710 | pin |
| 720 | cotter pin |
| 727 | alignment feature |
| 728 | bend |
| 729 | alignment extension |
| Dcs | chassis separation distance |
| $C_A$ | chassis/clearance area |
| Ds1 | support distance |
| Ds2 | support distance |

What is claimed is:

1. A towable system, comprising:
   a U-shaped chassis having a first side member and an opposed side member, each of the first side member and the opposed side member having a respective mounting surface, the first side member and the opposed side member defining a chassis separation distance and a chassis area; and
   a removable load module having a frame including rails and support members arranged to fit within the chassis area between the first side member and the opposed side member of the U-shaped chassis, the rails fixed to respective complimentary members having a planar surface that abuts and is supported by the respective mounting surface of the first side member and the opposed side member when the removable load module is in registration with the U-shaped chassis.

2. The towable system of claim 1, wherein the support members controllably adjust the frame with respective separately operable jacks.

3. The towable system of claim 2, wherein the respective separately operable jacks include a mechanism for adjusting a length of a support leg that extends from a body.

4. The towable system of claim 1, wherein at least one of the support members is coupled to the frame via a respective mount.

5. The towable system of claim 1, wherein at least one of the support members is removable from the respective mount.

6. The towable system of claim 1, wherein the load module includes a cargo specific support element supported by the frame.

7. The towable system of claim 1, wherein the first side member and the opposed side member of the U-shaped chassis define respective features for aligning and engaging the load module.

8. The towable system of claim 7, wherein the respective features include a hole.

9. The towable system of claim 7, wherein at least one of the first side member and the opposed side member and a respective one of the complimentary members are arranged to receive a pin.

10. The towable system of claim 7, wherein the respective features include a channel.

11. The towable system of claim 10, wherein one of the complimentary members includes a feature that extends into the channel.

12. The towable system of claim 7, wherein the respective features include a plate.

13. The towable system of claim 12, therein the plate extends beyond a corresponding mounting surface.

14. The towable system of claim 12, therein the plate includes a bend.

15. The towable system of claim 12, wherein the plate extends beyond a corresponding mounting surface in at least two directions.

16. The towable system of claim 1, wherein the first side member and the opposed side member of the U-shaped chassis each include respective first and second rails separated by at least two crossmembers, wherein a respective surface of the at least two crossmembers contacts the respective complimentary member when the removable load module is supported by the U-shaped chassis.

17. The towable system of claim 1, wherein the U-shaped chassis further includes a hitch member, a hitch crossmember, a first extension of the first side member connected to the hitch member and the hitch crossmember, and an opposed extension of the opposed side member connected to the hitch member and the hitch crossmember.

18. The towable system of claim 1, wherein the U-shaped chassis is arranged with at least one wheel assembly along each of the first side member and the opposed side member, respectively.

19. The towable system of claim 18, wherein the U-shaped chassis is maneuverable about the support members of the removable load module when the support members are independently supporting the removable load module.

20. The towable system of claim 18, wherein the U-shaped chassis is maneuverable below both a first complimentary member and an opposed complimentary member of the removable load module.

* * * * *